US008698833B2

(12) United States Patent
Anazawa

(10) Patent No.: US 8,698,833 B2
(45) Date of Patent: Apr. 15, 2014

(54) COLOR DESIGNATION CONTROL DEVICE, COLOR DESIGNATION CONTROL METHOD, AND MEDIUM STORING COLOR DESIGNATION CONTROL PROGRAM

(75) Inventor: Kengo Anazawa, Kagoshima (JP)

(73) Assignee: Seiko Epson Corporation, Tokyo (JP)

( * ) Notice: Subject to any disclaimer, the term of this patent is extended or adjusted under 35 U.S.C. 154(b) by 664 days.

(21) Appl. No.: 12/958,669

(22) Filed: Dec. 2, 2010

(65) Prior Publication Data

US 2011/0128562 A1 Jun. 2, 2011

(30) Foreign Application Priority Data

Dec. 2, 2009 (JP) ................................. 2009-274820

(51) Int. Cl.
*G09G 5/00* (2006.01)
*G09G 5/02* (2006.01)
*H04N 5/445* (2011.01)
*H04N 9/64* (2006.01)
*G03F 3/08* (2006.01)
*G03F 3/10* (2006.01)
*H04N 1/46* (2006.01)
*G06K 9/00* (2006.01)
*G06K 9/36* (2006.01)
*G06K 9/32* (2006.01)

(52) U.S. Cl.
USPC ........... 345/589; 345/619; 345/629; 345/660; 345/581; 348/552; 348/563; 348/649; 358/520; 358/527; 358/537; 358/453; 382/167; 382/254; 382/282; 382/298; 715/700; 715/815; 715/833

(58) Field of Classification Search
USPC ......... 345/581, 589, 593–594, 618–619, 629, 345/630, 660–661, 204, 690; 348/208.14, 348/210.99, 552, 557, 563–566, 578, 581, 348/630, 649–650; 358/518, 520, 527, 528, 358/537–538, 540, 448, 452–453; 382/162, 382/167, 173, 254, 276, 282, 284, 293, 382/298–299; 715/273, 275, 700, 764, 800, 715/815, 833, 856, 867
See application file for complete search history.

(56) References Cited

U.S. PATENT DOCUMENTS

| 5,416,890 | A  | * | 5/1995 | Beretta ......................... 345/590 |
| 8,259,373 | B2 |   | 9/2012 | Jung |
| 2005/0140996 | A1 | * | 6/2005 | Horiuchi et al. ............... 358/1.9 |
| 2007/0121180 | A1 |   | 5/2007 | Ogawa |

(Continued)

FOREIGN PATENT DOCUMENTS

| CN | 1928805 A | 3/2007 |
| CN | 101101629 A | 1/2008 |
| JP | 05-128225 A | 5/1993 |

(Continued)

*Primary Examiner* — Wesner Sajous
(74) *Attorney, Agent, or Firm* — Nutter McClennen & Fish LLP; John J. Penny, Jr.; Christina M. Sperry

(57) ABSTRACT

A color designation control device includes: an image acquisition section that acquires a color image; and a display control section that displays a user interface screen, which includes at least a preview image of the acquired color image and a hue scale representing a change in hue, on a predetermined display while accepting designation of a position or a region within the preview image, acquiring a hue at the designated position or in the designated region from the preview image, and adding a specific indication for a range within the hue scale corresponding to the acquired hue.

19 Claims, 10 Drawing Sheets

(56) References Cited

U.S. PATENT DOCUMENTS

| | | |
|---|---|---|
| 2007/0195347 A1* | 8/2007 | Momose et al. .............. 358/1.9 |
| 2008/0062193 A1* | 3/2008 | Olson ........................... 345/591 |
| 2008/0062443 A1* | 3/2008 | Olson ........................... 358/1.9 |
| 2008/0123946 A1 | 5/2008 | Kiuchi et al. |
| 2008/0246982 A1 | 10/2008 | Kaneko et al. |
| 2009/0214109 A1 | 8/2009 | Nakashima et al. |
| 2010/0157042 A1* | 6/2010 | Aizaki ........................... 348/79 |
| 2010/0201704 A1* | 8/2010 | Jang et al. .................... 345/594 |

FOREIGN PATENT DOCUMENTS

| | | |
|---|---|---|
| JP | 09-145633 A | 6/1997 |
| JP | 2007-036592 A | 2/2007 |
| JP | 2007-150943 A | 6/2007 |
| JP | 2008-263579 A | 10/2008 |
| JP | 2009-159185 A | 7/2009 |

* cited by examiner

FIG. 8
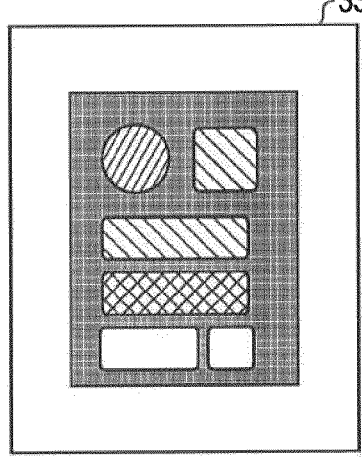
LIVE PREVIEW ⌐33
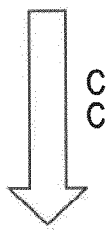
CHANGE IN CONJUNCTION WITH
CHANGE OF SPECIFIC INDICATION 32a
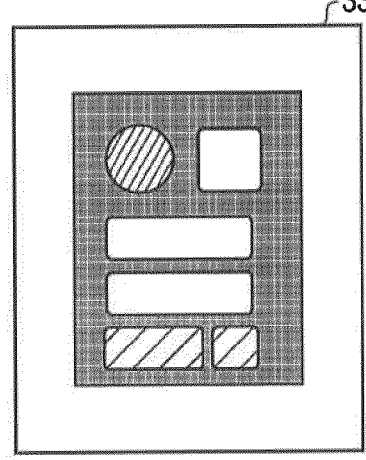
LIVE PREVIEW ⌐33

FIG. 10
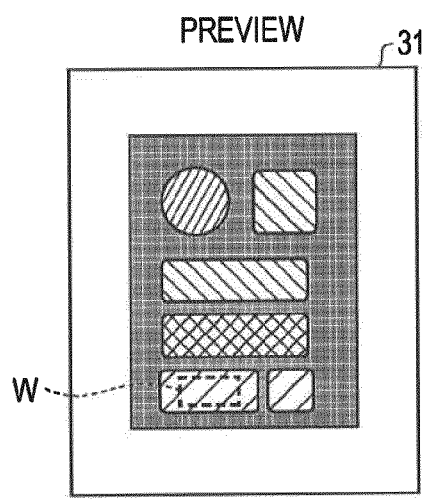
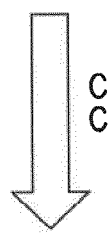
CHANGE IN CONJUNCTION WITH
CHANGE OF SPECIFIC INDICATION 32a
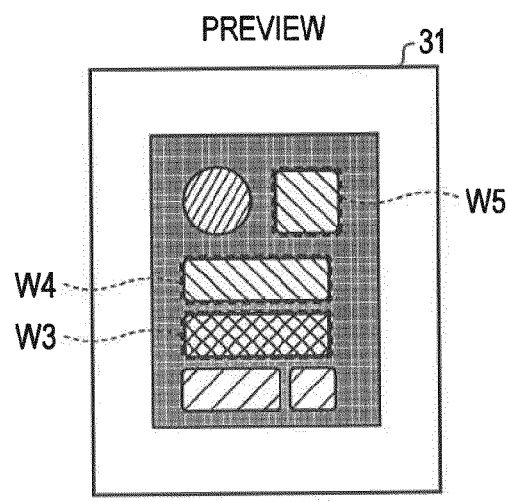

COLOR DESIGNATION CONTROL DEVICE, COLOR DESIGNATION CONTROL METHOD, AND MEDIUM STORING COLOR DESIGNATION CONTROL PROGRAM

INCORPORATED BY REFERENCE

The entire disclosure of Japanese Patent Application No. 2009-274820, filed Dec. 2, 2009 is expressly incorporated by reference herein.

BACKGROUND

1. Technical Field

The present invention relates to a color designation control device, a color designation control method, and a color designation control program.

2. Related Art

In the image processing field, in some cases where a scanner reads a color image, by allowing a user to designate a desired color, a highlighting process or a drop-out process may be performed on the designated color. Such methods of designating a color are mainly classified into the following two methods. The first method is a method of displaying a hue (hue circle) represented as a circular graph, a linear spectrum, or a color palette in a user interface (UI) screen on a display of a personal computer (PC) and designating a desired color of a user from the hue circle, the spectrum, or the color palette. As a related art, there is a known parameter setting method of setting a range (an upper limit and a lower limit) of each color parameter by displaying axial images, which correspond to color parameters such as lightness data BRT and hue scales ROP, GOP, and POP, on the screen and by allowing an operator to perform a cursor operation (refer to JP-A-9-145633).

The second method is a method of allowing a user to optionally designate a point within a preview image displayed on a UI screen and designating the color corresponding to the designated point. As a related art, there is a known color designating/extracting device that designates a color by allowing an operator to designate one point with a mouse or a light pen in a color image displayed on a display and extracts a color in a predetermined range based on the designated color (refer to JP-A-5-128225). Further, there is a known drop-out color processing device that displays a pseudo 3-dimensional histogram as a result of conversion of an input RGB image based on HSV (hue, saturation, value (lightness)), clicks a certain point in the histogram image, extracts a color set (a branch) relating to the clicked color, and designates the branch as a drop-out color range (refer to JP-A-2009-159185).

In the first method, the surrounding environment (such as illumination) at that time also has an effect on the user. For this reason, it is difficult to accurately designate a color, which is identical to the color to be originally designated in the color image, from the hue circle, the spectrum, or the color palette, in a way of visually confirming the color. That is, it is difficult for the user to perform an intuitive operation. Accordingly, in order to finally obtain a desired effect (the highlighting or the drop-out of the desired color), it is necessary to repeat the operation or improve an operating skill.

In the second method, a point within the preview image is selected, and thus there may be a range in the color, which is a designation target desired by the user, in the preview image (there may be unevenness in the color which is a desired designation target). In this case, the entire target is not necessarily highlighted or is not necessarily made to drop out, and there is a concern that unevenness occurs in the result of the highlighting or drop-out process. Further, as disclosed in JP-A-5-128225 and JP-A-2009-159185, even in the case where the predetermined color range including the designated color is extracted, the color range extracted in such methods may not be the color range the user really wants. Hence, in some cases, it may be difficult to obtain the result of the highlighting process or the drop-out process that obtains user satisfaction.

SUMMARY

An advantage of some aspects of the invention is to provide a color designation control device, a color designation control method, and a color designation control program capable of accurate color designation which is intuitive, simple, and easy for a user as compared with the related art.

According to an aspect of the invention, a color designation control device includes an image acquisition section that acquires a color image; and a display control section that displays a user interface (UI) screen, which includes at least a preview image of the acquired color image and a hue scale representing a change in hue, on a predetermined display while accepting designation of a position or a region within the preview image, acquiring a hue at the designated position or in the designated region from the preview image, and adding a specific indication for a range within the hue scale corresponding to the acquired hue.

In the aspect of the invention, the user is able to freely designate the desired color designation position or region in the preview image on the UT screen. In addition, the hue at the designated position or in the designated region is clearly shown as a specific indication in the hue scale on the UI screen. Hence, it is possible to clearly recognize the color of the designated position or region. Consequently, as compared with the methods in the related art, the user is able to accurately designate a color, which is a desired designation target, in the color image in an intuitive, simple, and easy method.

It is preferable that the display control section should be able to accept designation of a plurality of positions or a plurality of regions within the preview image, acquire hues at the plurality of designated positions or in the plurality of designated regions, and add specific indications for a plurality of ranges within the hue scale corresponding to the respective hues which are acquired for each of the plurality of designated positions or the plurality of designated regions. With such a configuration, the user is able to accurately designate the color, which is a desired designation target, without omission from the color image. In addition, it is preferable that, when the plurality of specific indications at least partially overlaps, the plurality of specific indications which overlaps should be unified into one specific indication. With such a configuration, the specific indication in the hue scale is simplified, and thus it becomes more visible.

It is preferable that the display control section should display a frame, of which a position and a size is changeable, in the preview image while being able to accept chance of the position and/or the size of the frame and accept the designation of the position and the region in the preview image on the basis of the frame. With such a configuration, by operating an input device such as a mouse so as to optionally change the position and the size of the frame, the user is able to simply and easily designate the desired color designation position or region in the preview image.

It is preferable that, when the hue scale represents an entire hue range except the achromatic colors, the display control section should reject the acceptance of the designation of the region corresponding to an entire range of the hue scale in the preview image. With such a configuration, it is possible to prevent the result of the color highlighting process or the color drop-out process from becoming meaningless due to designating all hues except the achromatic colors (white, black, and gray) in the color image.

It is preferable that the display control section should display a live preview image, which is a grayscale image of the color image and in which a portion of the color image has the hue corresponding to the specific indication within the hue scale is highlighted or is made to drop out, in the user interface screen. With such a configuration, by viewing the live preview image, the user is able to check, in real time, how the result of the designation of the position or the region, which is designated by the user himself through the preview image, is reflected in the highlighting process or the drop-out process. Accordingly, it is possible to reliably perform the color designation which is most appropriate to obtain a desired process result.

It is preferable that the display control section is able to accept change of a range of the specific indication in the hue scale, and changes the highlighted or drop-out portion of the live preview image in accordance with the accepted change of the range of the specific indication. With such a configuration, by allowing the user himself to change the specific indication, the user is also able to perform the color designation which is most appropriate to obtain the desired process result.

It is preferable that the display control section should change the designated position or the designated region of the preview image in accordance with the change of the range of the specific indication. With such a configuration, in conjunction with the change of the specific indication, the position or the region, which is designated by using the preview image, is also changed. Accordingly, by changing the specific indication, the user is able to check which color is designated in the preview image.

It is preferable that, when generating a plurality of designated regions in the preview image as a result of the change in the designated position or the designated region of the preview image, the display control section should display only the largest one of the designated regions of the preview image in the preview image. With such a configuration, it is possible to reduce the processing load of the color designation control device. Alternatively, it is also preferable that, when generating a plurality of designated positions and/or a plurality of designated regions in the preview image as a result of the change in the designated position or the designated region of the preview image, the display control section should display all the designated positions and/or the designated regions in the preview image. With such a configuration, by changing the specific indication, the user is able to reliably check which color is designated in the preview image.

The technical idea of the aspects of the invention can be also embodied as something other than the color designation control device. For example, the idea can be embodied as a color designation control method having processes which are executed by the respective parts of the above-mentioned color designation control device. In addition, the idea can be embodied as a color designation control program for causing a predetermined hardware (such as a computer built in the color designation control device) to execute the functions which are executed by the respective parts of the above-mentioned color designation control device.

BRIEF DESCRIPTION OF TEE DRAWINGS

The invention will be described with reference to the accompanying drawings, wherein like numbers reference like elements.

FIG. 8 is a diagram illustrating a situation in which a live preview image is changed.

FIG. 10 is a diagram illustrating a situation in which the designation frame within the preview screen is changed.

DESCRIPTION OF EXEMPLARY EMBODIMENTS

Hereinafter, an embodiment of the invention will be described with reference to the accompanying drawings.

1. Brief Overview of Device Configuration According to the Embodiment

Figure 1:
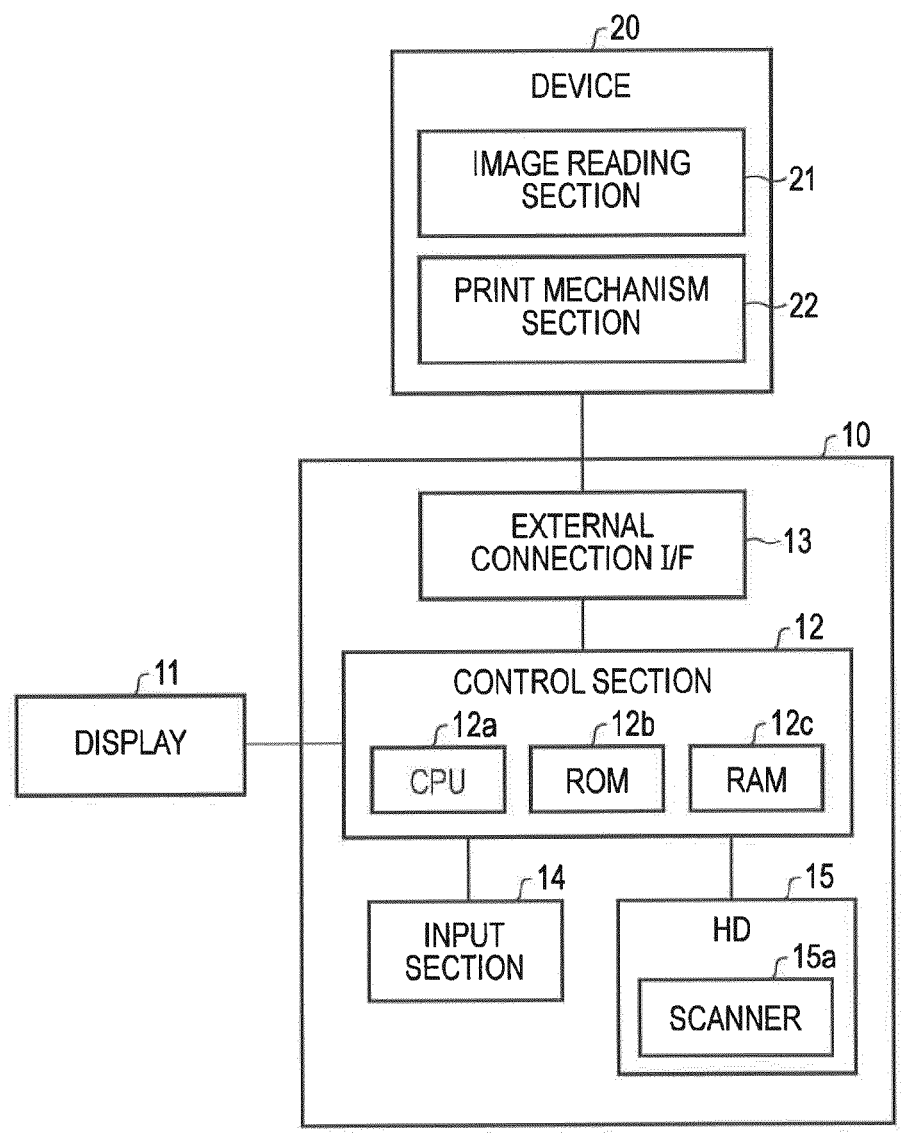
FIG. 1 is a block diagram illustrating an example of a brief overview of a device configuration according to an embodiment.

FIG. 1 is a block diagram illustrating an example of a brief overview of a device configuration according to the embodiment. FIG. 1 shows a device 20, a PC 10 which controls the device 20, and a display 11 which is controlled by the PC 10. The device 20 is a device functioning as at least a scanner, and has a scanner function, a copy function, and a print function in the embodiment. Specifically, the device 20 includes an image reading section 21, a print mechanism section 22, and the like. The image reading section 21 reads an original document set on a platen, which is provided in the device 20 and is not shown, through an optical sensor, and generates image data of the original document. The image data generated by the image reading section 21 is transmitted to the PC 10, is saved in a predetermined memory within the device 20, or is transmitted to the print mechanism section 22.

The print mechanism section 22 is a unit (so-called printing engine) capable of printing on a sheet on the basis of the image data transmitted from the PC 10 or the image data transmitted from the image reading section 21. Furthermore, the device 20 has a display (a liquid crystal panel) which is not shown and an operation accepting section including buttons, switches, and the like which are not shown. It is apparent that the device 20 may be a multi-function peripheral having various additional functions such as a facsimile function or conversely the device 20 may be a device having only a scanner function.

The PC 10 has an external connection interface (I/F) 13, a control section. 12 including a CPU 12a, a ROM 12b, a RAM 12c, and the like, an input section 14 as various input, devices such as a mouse and a keyboard used by the user in input operation for the PC 10, a hard disc (HD) 15, and the like. The external connection I/F 13 is controlled by the control section 12, and transmits data and a signal to the device 20 and receives the data and the signal transmitted from the device 20. The control section 12 is connected to each part of the PC 10. In the control section 12, the CPU 12a appropriately uses the RAM 12c as a work area, and executes a predetermined program or driver stored in the ROM 12b or the HD 15, thereby controlling not only the respective parts of the PC 10 but also the display 11 and the device 20. The HD 15 stores, for example, a scanner driver 15a for controlling driving of the device 20.

Hereinbelow, the embodiment will be described as an example of a process (a color designation control process) in which the PC 10 the control section 12) allows a user to perform color designation on the UI screen rendered by the scanner driver 15a. In terms of executing the color designation control process, the PC 10 equipped with the scanner driver 15a corresponds to an example of the color designation control device. The scanner driver 15a has an additional function of the color designation control program. However, the color designation control process may be executed by the device 20. Specifically, the device 20 itself may serve as the color designation control device, and thus may accept color designation performed by the user while displaying the UI screen 30 to be described later on a liquid crystal panel or the like provided in the device 20.

2. Image Processing Including Color Designation Control Process

Figure 2:
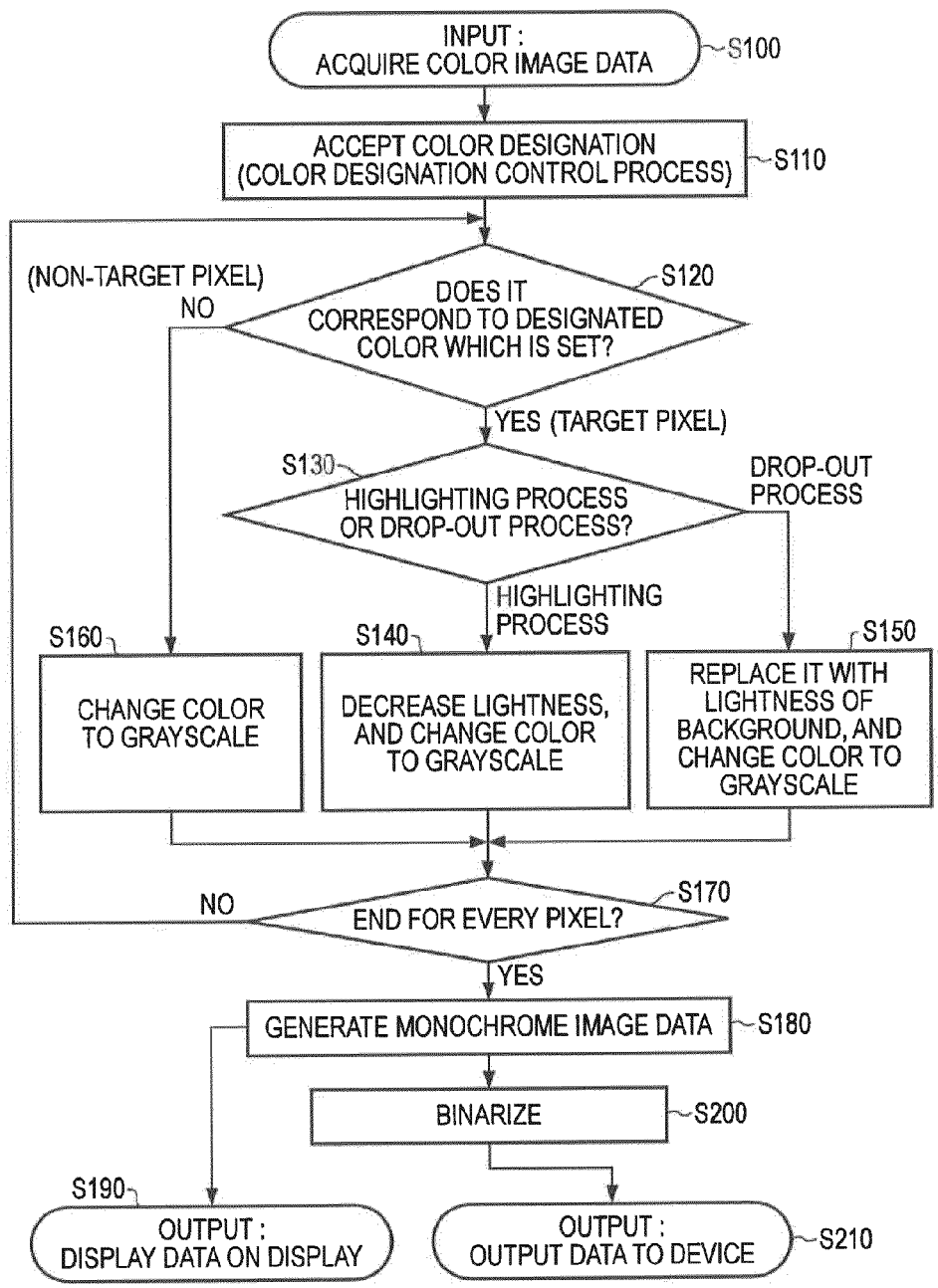
FIG. 2 is a flowchart illustrating an example of image processing including a color designation control process.

FIG. 2 is a flowchart illustrating an example of image processing, which includes a color designation control process, executed by the control section 12. In the flowchart, the control section 12 executes the image processing with the aid of the scanner driver 15a and the like. In step S100, the control section 12 acquires color image data. That is, the user operates the input section 14 so as to launch the scanner driver 15a and issue a predetermined reading instruction, and thereby the control section 12 starts drive control of the device 20. Then, in the device 20, color image data is generated by allowing the image reading section 21 to scan the original document, and the color image data is transmitted to the PC 10. In the PC 10, the control section 12 acquires the color image data through the external connection I/F 13. The color image data is, for example, bitmap data having the respective gray levels of RGB for each pixel. In terms of being capable of executing the step S100, it may be said that the control section 12 functions as an image acquisition section.

In step S110, the control section 12 controls the display 11, thereby displaying the predetermined UI screen on the display 11 and accepting the color designation performed by the user through the UI screen. That is, step S110 corresponds to the color designation control process. The process content of step S110 will be described later.

In step S120, the control section 12 determines whether or not the hue corresponds to the designated color (the hue or the hue range) set in the above-mentioned step S110 for one pixel constituting the color image data. In such a manner, the corresponding one pixel is classified into a target pixel (a pixel corresponding to the designated color) or a pixel other than the target pixel (a non-target pixel). In the control section 12, if the corresponding one pixel is determined as the target pixel, the procedure advances to step S130. In contrast, if the corresponding one pixel is determined as the non-target pixel, the procedure advances to step S160.

In step S130, the control section 12 determines the types of the processes to be executed on the target pixel. In the embodiment, either the highlighting process or the drop-out process is executed on the target image. In step S100 or step S110, which one of the highlighting process and the drop-out process to execute may be set in advance by the user through the input operation. The control section 12 determines that either the highlighting process or the drop-out process is to be executed depending on the setting made by the user. If the control section 12 selects the highlighting process, the procedure advances to step S140. In contrast, if the drop-out process is selected, the procedure advances to step S150.

In step S140, the control section 12 decreases the lightness of the target pixel, and changes the color of the pixel to grayscale. In this case, the control section 12 converts the target pixel from a color pixel having gray levels of RGB into a monochrome pixel. The monochrome pixel has only lightness information (a gray level of 1 channel), and the lightness thereof is reduced to a minimum value (black) or a predetermined value close to the minimum value.

On the other hand, in step S150, the control section 12 changes the color of the target pixel to grayscale by replacing the lightness thereof with a lightness of a background region. The method of determining the lightness of the background region is not especially limited. However, for example, the control section 12 may determine an average lightness of a region, which is designated in advance as a background in the input color image by the user in the step S110 or the like, as the lightness of the background region. Alternatively, the control section 12 may determine a lightness (for example, a predetermined high value in lightness representing the white color of a sheet), which is set as the lightness of the background region in advance, as the lightness of the background region. The control section 12 converts the target pixel from the color pixel into a monochrome pixel which has only lightness information and of which the lightness is set as the lightness of the background region.

In step S160, the control section 12 converts the non-target pixel into the monochrome pixel corresponding to the lightness thereof by changing the color of the non-target pixel to grayscale.

In step S170, the control section 12 determines whether or not the processes from step S120 are terminated for every pixel constituting the color image data. If unprocessed pixels remain, the procedure returns to step S120, the processes from step S120 are repeatedly performed on each unprocessed pixel. In contrast, if the processes from step S120 are completely performed on all pixels constituting the color image data, the control section 12 generates a monochrome image from the monochrome pixels which are obtained by the processes performed so far in step S180. Accordingly, as described above, in the case where execution of the highlighting process is set by a user, as the result of the aforementioned step S180, it is possible to obtain monochrome image data in which the designated color of each target pixel is highlighted (deepened). In contrast, in the case where execution of the drop-out process is set by a user, as the result of the aforementioned step S180, it is possible to obtain monochrome image data in which the designated color of each target pixel is assimilated with the background within the image (the color is made to drop out).

Thereafter, for example, the control section 12 is able to display the monochrome image data which is generated in the aforementioned step S180, on the display 11 (step S190). Alternatively, the control section 12 is able to binarize the monochrome image data (step S200), output the data to the device 20 (step S210), and allow the device 20 to print the monochrome image.

3. Color Designation Control Process

Figure 3:
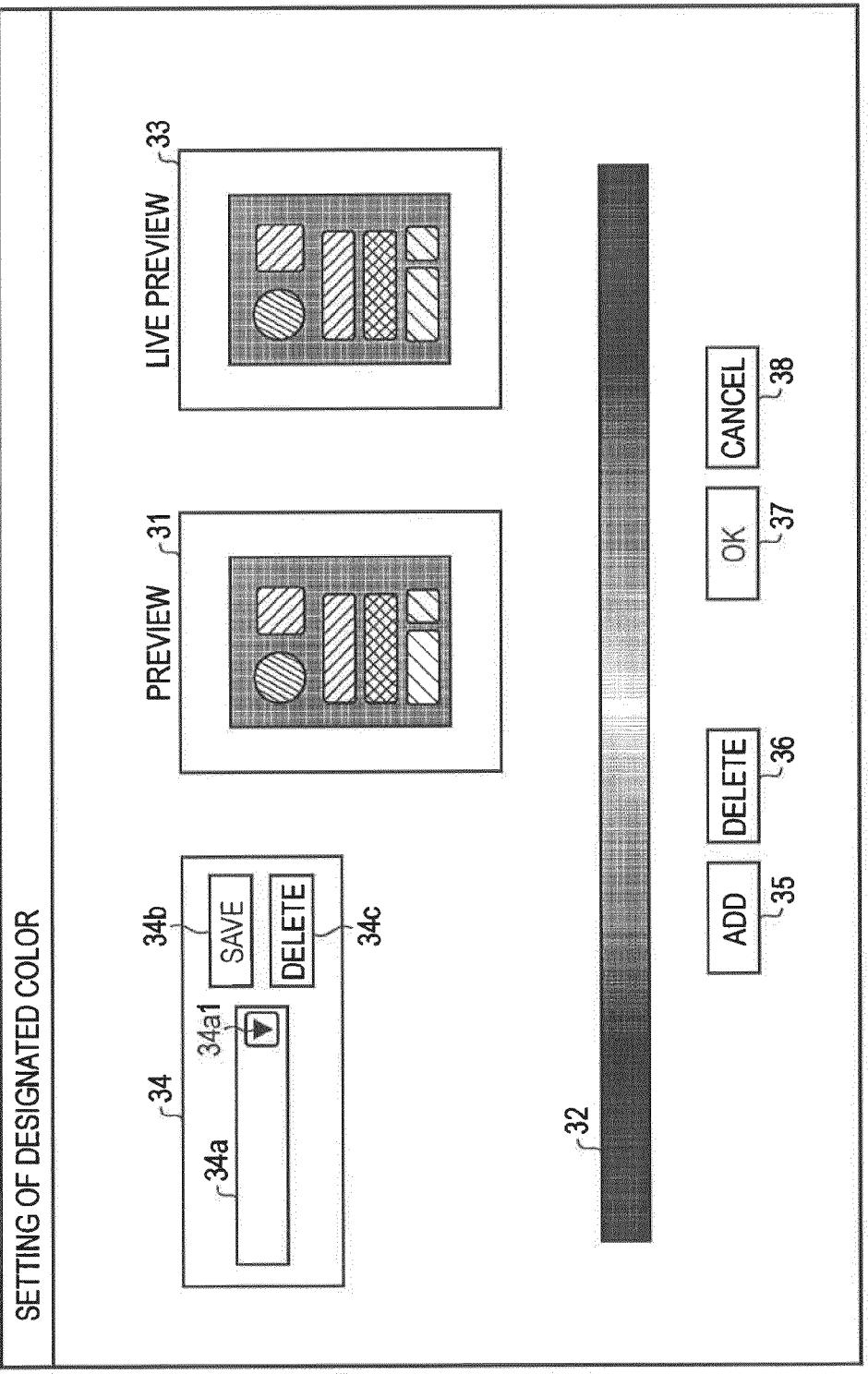
FIG. 3 is a diagram illustrating an example of a UI screen.

FIGS. 3 to 9 show examples of a UI screen 30 (or a part of the UI screen 30) which is displayed on the display 11 by the control section 12 in step S110 in the embodiment. In terms of displaying the UI screen 30 by controlling the display 11, it may be said that the control section 12 functions as a display control section. The control section 12 allows setting of which one of the highlighting process and the drop-out process to execute in accordance with the user's input operation through the UI screen (the master screen of the UI screen 30) which is displayed on the display 11 previous to the UI screen 30. After the setting is made through the master screen, the control section 12 displays the UI screen 30 shown in FIG. 3. As shown in FIG. 3, the UI screen 30 includes at least a preview image 31 and a hue scale 32. Further, the UI screen 30 includes a live preview image 33. Furthermore, the UI screen 30 includes a designated color save/delete item 34, an add button 35, a delete button 36, an OK button 37, a cancel button 38, and the like. The designated color save/delete item 34 includes a name save/selection frame 34a, a pull-down button 34a1, a save button 34b, and a delete button 34c. The user operates (clicks) the cancel button 38 by operating the input section 14, and thereby the display of the UI screen 30 is cleared and can be returned to the master screen.

The preview image 31 is a miniaturized image (a thumbnail image) of the color image data acquired in step S100, and is displayed in color. On the other hand, the live preview image 33 is a grayscale image (a monochrome image) of the corresponding miniaturized image. In the live preview image 33, as described later, the effect of the highlighting process or drop-out process is represented in real time in conjunction with the color designation operation performed by the user. The hue scale 32 is a linear spectrum representing change in hue (gradation), and is a color image for representing the entire hue range except the achromatic colors (white, black, and gray). The UI screen 30 is able to display a designation frame W in the preview image 31 by allowing the user to operate the input section 14, for example, to operate the add button 35.

Figure 4:
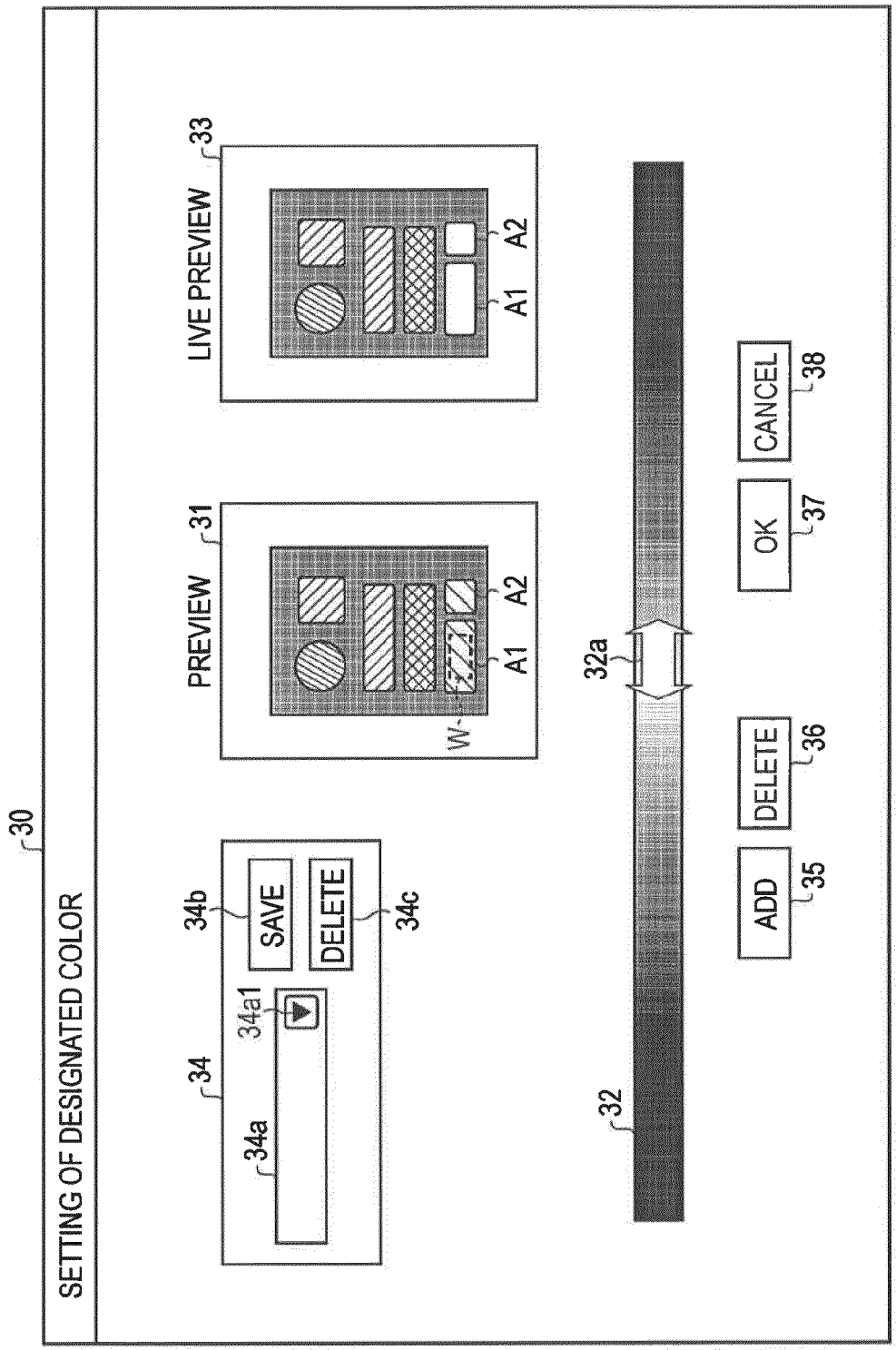
FIG. 4 is a diagram illustrating an example of a situation in which color designation is performed by using a designation frame in a UI screen.

FIG. 4 shows an example of a situation in which the control section 12 displays the designation frame W (the chain line) in the preview image 31 on the basis of the user's operation. The designation frame W has a rectangular shape. However, the designation frame W may have a circular shape. By operating the input section 14, the user is able to freely change (move) the position and change (enlarge/reduce) the size of the designation frame W in the preview image 31. In addition, when the user reduces the designation frame W up to the minimum size, the control section 12 recognizes the designation frame W as a point (a position as a single coordinate). That is, the control section 12 accepts the designation of the position or region thereof in the preview image 31 by using the designation frame W.

Further, as shown in FIG. 4, in the hue scale 32, the specific indication 32a for indicating a hue range corresponding to the hue within the designation frame W is added. The design of the specific indication 32a is not limited, but for example, the specific indication may be designed to have a bidirectional arrow shape representing the length of the corresponding hue range as shown in the drawing. By analyzing the pixels within the designation frame W which resides in the current preview image 31, the control section 12 extracts all hues belonging to the respective pixels within the designation frame W in the preview image 31, and executes the process of displaying the specific indication 32a in the hue range within the hue scale 32 corresponding to all the extracted hues, in conjunction with the change of the position and the size of the designation frame W which is accepted through the input section 14. When the designation frame W is reduced to the minimum size, the control section 12 adds the specific indication 32a to the position within the hue scale 32 corresponding to the hue at the position of the designation frame W. In the embodiment, the hue (the hue range) indicated by the specific indication 32a in the hue scale 32 is simply referred to as a designated color.

For example, in FIG. 4, the designation frame W resides in the image region A1 represented by a red-based color in the preview image 31, and consequently the specific indication 32a is also added in a red-based hue range within the hue scale 32. As unevenness of the red-based color within the designation frame W is smaller (as the change in the color is smaller), the hue range, which is indicated by the specific indication 32a, is narrower. In contrast, as the change in the red-based color within the designation frame W is greater, the hue range, which is indicated by the specific indication 32a, is wider. Further, when the designation frame W includes various colors such as a red-based color and a blue-based color, in the hue scale 32, a plurality of specific indications 32a is added to a plurality of separated positions (the red-based hue range and the blue-based hue range).

Further, as shown in FIG. 4, in the live preview image 33, the portion of the color image has the hue corresponding to the specific indication 32a within the hue scale 32 is subjected to drop-out processes. Specifically, the control section 12 displays the live preview image 33 in which the portion of the color image having a hue (when plural hues are mixed in the designation frame W, a hue the same as any one of the plural hues) the same as the hue within the corresponding designation frame W is made to drop out from the region of the preview image 31 surrounded by the designation frame W and the outside of the same region. For example, as shown in FIG. 4, the designation frame W surrounds a partial region of the image region A1 in the preview image 31. Thus, when the other region within the image region A1 and the image region A2 different from the image region A1 in the preview image 31 have the same hue as the region surrounded by the corresponding designation frame W, in the live preview image 33, the image region A1 and the image region A2 are subjected to the drop-out process. In addition, here, the drop-out process is set in the master screen. Hence, the drop-out effect is exerted on the live preview screen 33 of the UI screen 30. It is apparent that, when the highlighting process is set in the master screen, the effect of the highlighting process is exerted on the live preview screen 33.

By operating the add button 35, the user is able to add the designation frame W into the preview image 31 and designate the desired positions or regions within the preview image 31 by using the designation frames W.

Figure 5:
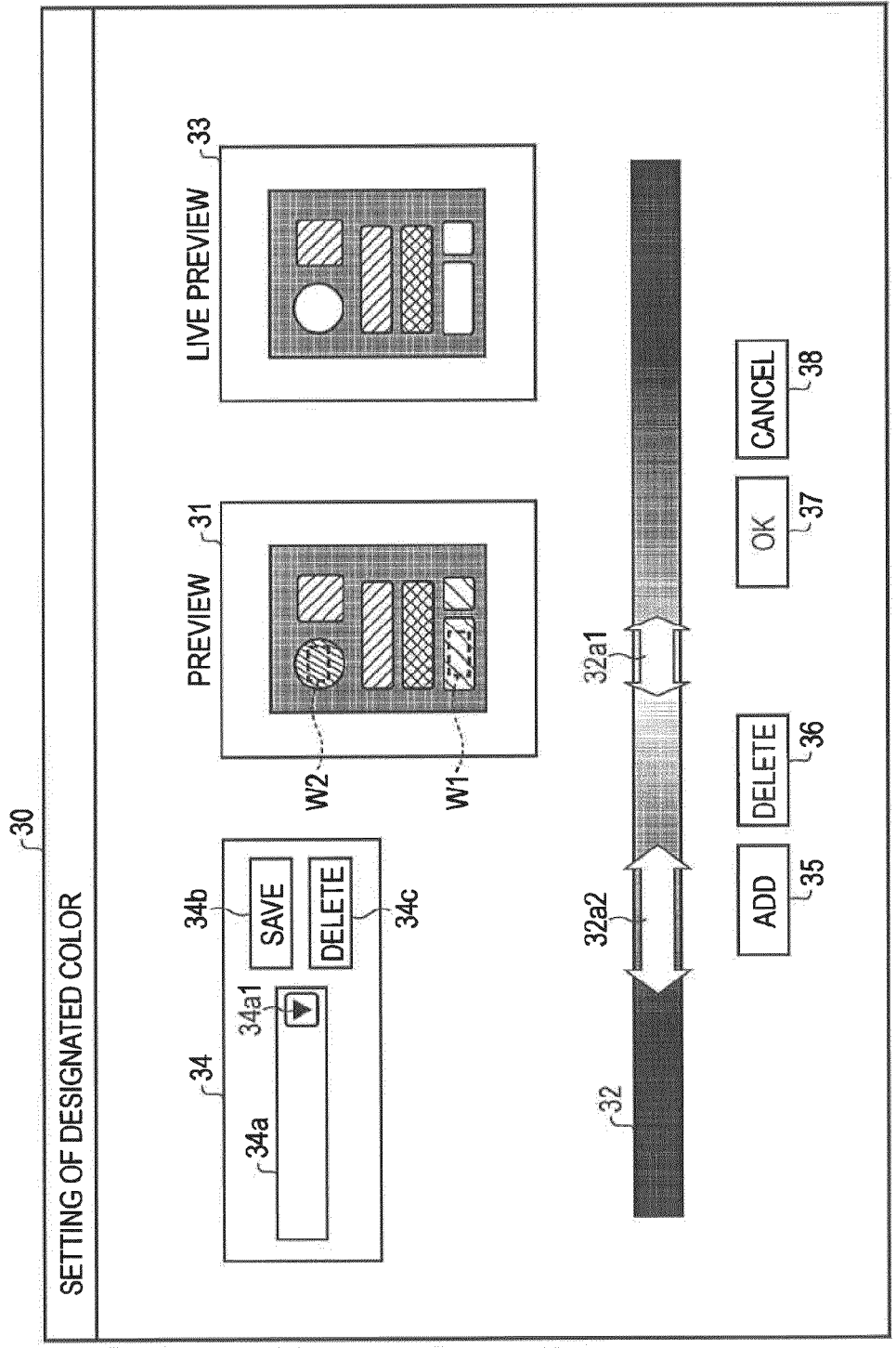
FIG. 5 is a diagram illustrating an example of a situation in which color designation is performed by using a plurality of designation frames in the UI screen.

FIG. 5 shows an example of a situation in which the control section 12 displays a plurality of designation frames W (designation frames W1 and W2) in the preview image 31. In this case, in response to the respective designation frames W1 and W2, the specific indications 32a (specific indications 32a1 and 32a2) are displayed in the hue scale 32. It is apparent that, in the live preview image 33, the portions corresponding to the respective hue ranges of the specific indications 32a1 and 32a2 corresponding to the designation frames W1 and W2 are subjected to the drop-out process (or the highlighting process).

Figure 6:
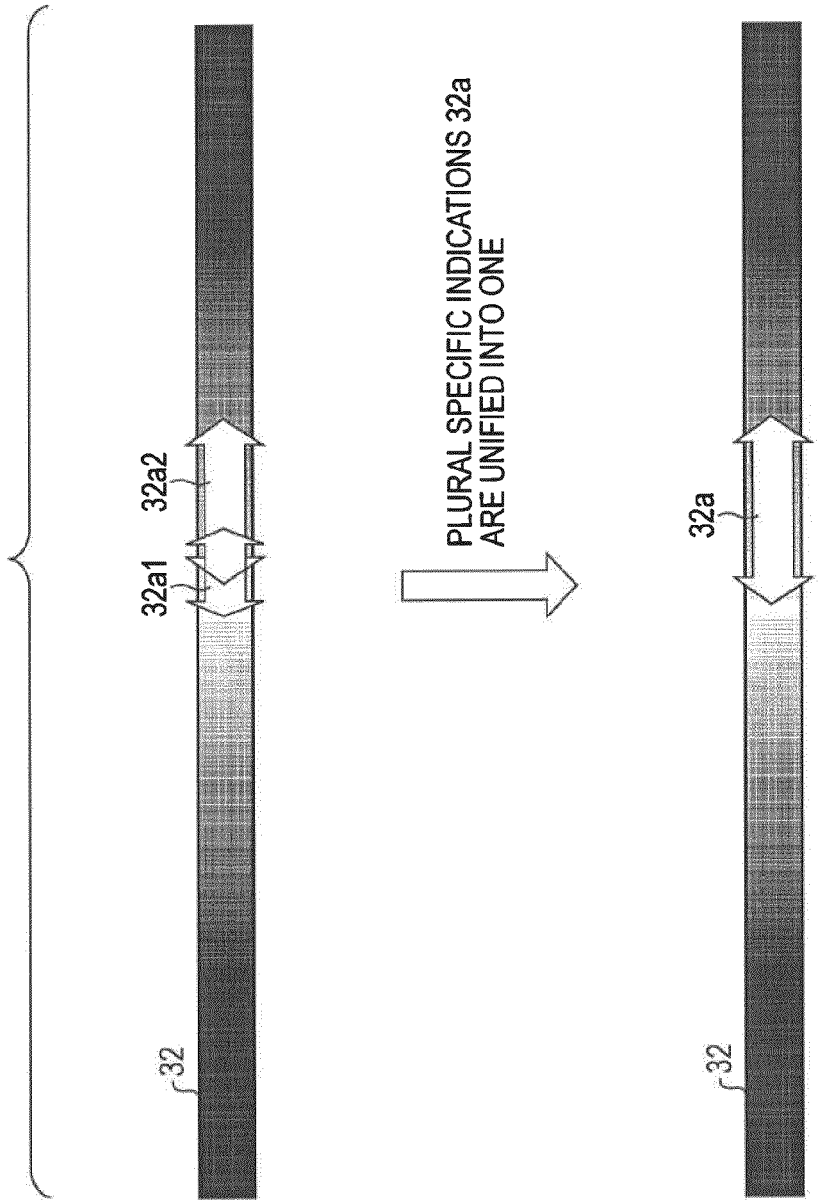
FIG. 6 is a diagram illustrating a situation in which a plurality of specific indications is unified into one.

FIG. 6 shows an example of a situation in which the specific indication 32a1 and the specific indication 32a2 partially overlapping with each other in the hue scale 32 are unified. As described above, when the user optionally sets the plurality of designation frames W in the preview image 31, the respective specific indications 32a may overlap with each other in the hue scale 32 depending on the hues included in the respective designation frames W. The upper part of FIG. 6 shows the situation in which, when the specific indication 32a1 corresponding to the designation frame W1 and the specific indication 32a2 corresponding to the designation frame W2 are separately displayed in the hue scale 32 as it is, those partially overlap with each other. When the plurality of specific indications 32a at least partially overlaps, the control section 12 unifies the plurality of specific indications 32a which overlaps into one specific indication 32a. That is, as shown in the lower part of FIG. 6, the control section 12 displays one specific indication 32a, into which the specific indication 32a1 and the specific indication 32a2 are unified, in the hue scale 32. With such a configuration, the specific indication 32a in the hue scale 32 is made to be remarkably visible, and thus the configuration is very appropriate. It should be noted that the situation, in which the plurality of specific indications 32a overlaps as shown in the upper part of FIG. 6, is actually not displayed in the UI screen 30.

For example, by operating the delete button 36, the user is able to delete the designation frame W set in the preview image 31. In this case, the control section 12 accepts the selection of several designation frames W in the display in the preview image 31 by a click operation of the mouse and the like. Then, when accepting the operation of the delete button 36, the control section 12 deletes the selected designation frames W from the preview image 31. The control section 12 also deletes, at the same time as the deletion, the specific indication 32a corresponding to the designation frame W as a target of the deletion in the hue scale 32, and releases the drop-out process (or the highlighting process) for the portion within the live preview image 33 corresponding to the hue of the deleted specific indication 32a. As described above, according to the embodiment, by freely adding or deleting the designation frame W, the user is able to designate the desired position or region within the preview image 31.

Figure 7:
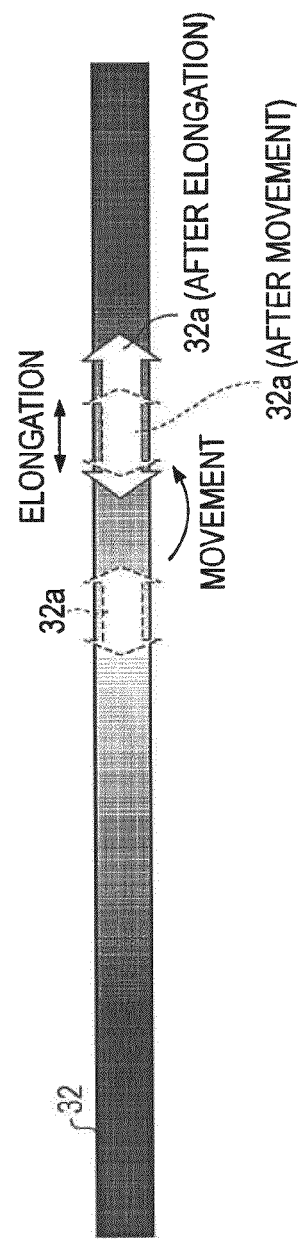
FIG. 7 is a diagram illustrating situations in which the specific indication is moved and is elongated or shortened.

FIG. 7 shows an example of a situation in which the specific indication 32a is directly operated in the hue scale 32. In the embodiment, the user is able to perform the color designation not only by setting the designation frame W in the preview image 31 as described above but also by directly operating the specific indication 32a through the input section 14. As shown in FIG. 7, for example, by clicking and dragging the specific indication 32a with the mouse, the user is able to move the position of the specific indication 32a in the hue scale 32 or elongate or shorten the length of the hue range which is indicated by the specific indication 32a. In addition, by operating the input section 14 so as to delete the specific indication 32a or drag to a location at which the specific indication 32a within the hue scale 32 is not displayed, the user is able to generate a new specific indication 32a at the location.

The control section 12 is able to accept the operation of changing the range of the specific indication 32a in the hue scale 32 through the input section 14. The control section 12 changes (moves, enlarges/reduces, and increases/decreases the highlighted or drop-out portion) the drop-out (or highlighted) portion in the live preview image 33 in accordance with the corresponding accepted range change (movement, enlargement/reduction, increase/decrease, and the like).

FIG. 8 shows an example of a situation in which the control section 12 changes the live preview image 33 in conjunction with the movement and elongation of the specific indication 32a shown in FIG. 7. The live preview image 33 shown in the upper part of FIG. 8 is changed, in conjunction with the movement and the elongation of the specific indication 32a, into the live preview image 33 in which the drop-out portion is moved and increased as shown in the lower part of FIG. 8. As described above, in the embodiment, the user optionally sets the designation frame W in the preview image 31, thereby displaying the specific indication 32a in the hue scale 32. Then, by directly adjusting the range of the specific indication 32a, the user is able to reliably designate the hue range the user really wants to designate.

For example, by allowing the user to operate the OK button 37, it is possible to terminate the process in the aforementioned step S110. That is, the control section 12 sets the hue or hue range (the designated color), which is indicated by the specific indication 32a in the hue scale 32 at the time of accepting the operation for the OK button 37, as a designated color for determining the target pixels, and the procedure advances to step S120.

In the embodiment, by operating the designated color save/delete item 34, the user is able to save the designated color with a new file name. Specifically, the user sets the designation frame W, adjusts the specific indication 32a, and checks the live preview image 33, and thereby the specific indication 32a can be displayed in the desired range of the hue scale 32. At this time point, the user optionally inputs a name to the name save/selection frame 34a within the designated color save/delete item 34 by operating the keyboard or the like. Then, the user operates the save button 34b. The control section 12, which accepts the input of the name and the operation performed on the save button 34b, checks that the input name does not correspond to names which have been saved in the past. Then, the control section 12 stores the designated color at that time in a predetermined memory in association with the input name. After the save, when the user presses the OK button 37, the control section 12 sets the designated color, which is saved, as a designated color for determining the target pixels, and the procedure advances to step S120.

Further, by operating the designated color save/delete item 34, the user is able to optionally select the designated color from the designated colors which have been saved in the past.

Figure 9:
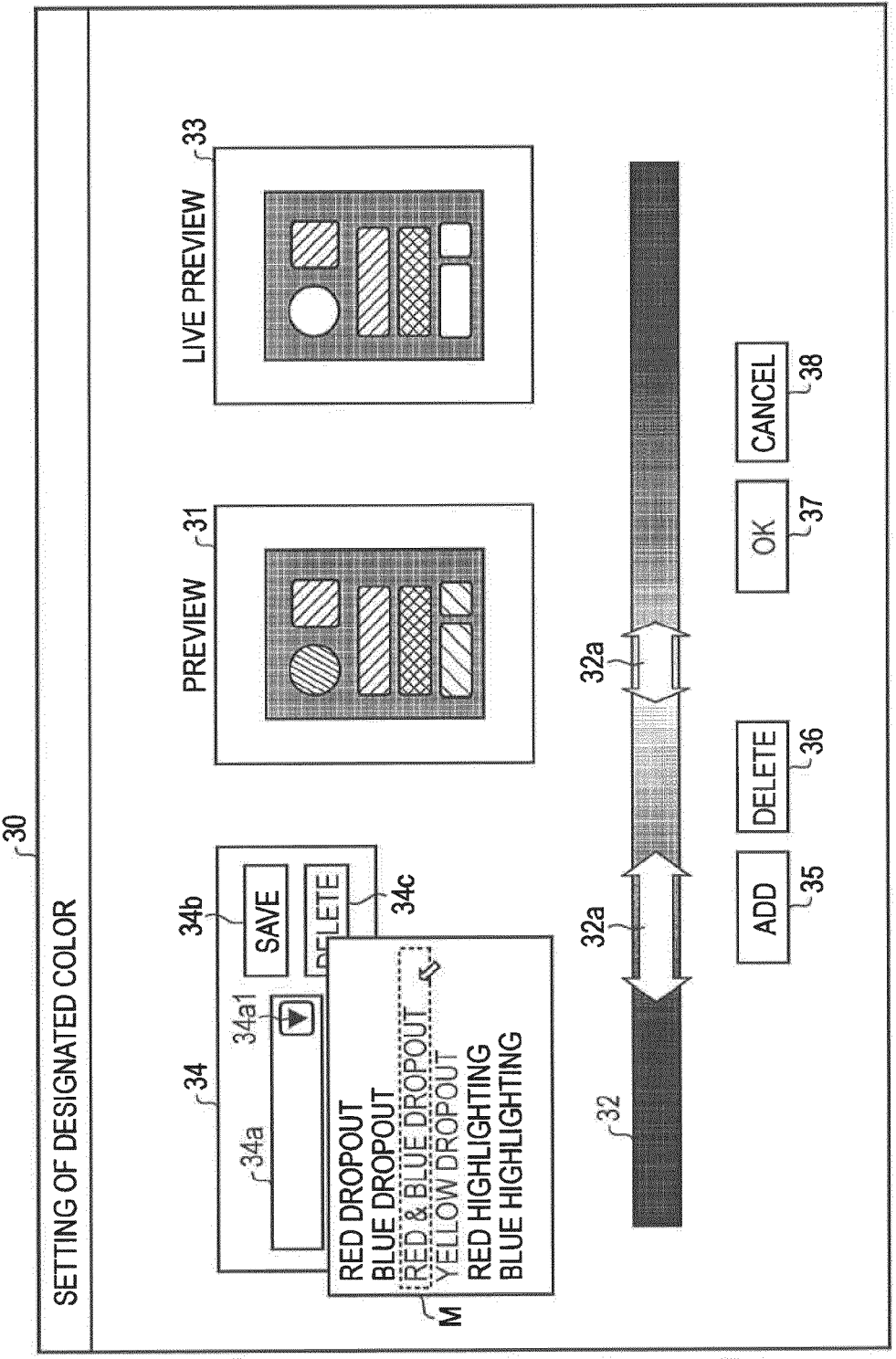
FIG. 9 is a diagram illustrating a situation in which the designated color is selected from the pull-down menu in the UI screen.

As shown in FIG. 9, the control section 12 accepts the operation performed on the pull-down button 34a1 which is provided in the name save/selection frame 34a, thereby displaying the pull-down menu M. In the pull-down menu M, the names for each designated color, which have been saved in the past, are displayed in a list form. By operating the input section 14, the user optionally selects (for example, selects a name of "drop-out red & blue") a name from the pull-down menu M, and operates the OK button 37. Then, the control section 12 sets the designated colors, which have been saved in the past in association with the name selected as described above, as the designated colors for determining the target pixels, and the procedure advances to step S120. In addition, at the time point at which the name is selected from the pull-down menu M, the control section 12 displays, as shown in FIG. 9, the hue ranges of the designated colors, which have been saved in association with the selected name, as the specific indications 32a in the hue scale 32. Concurrently, the control section 12 performs the drop-out process (or the highlighting process) on the portions corresponding to the hue ranges in the live preview image 33, and displays the live preview image 33.

Further, by operating the designated color save/delete item 34, the user is able to optionally delete the designated color from the designated colors which have been saved in the past. That is, by operating the input section 14, the user optionally selects the name in the pull-down menu M, and operates the delete button 34c. Then, the control section 12 deletes the selected name and information corresponding to the designated color which have been saved in the past in association with the corresponding name.

As described above, according to the embodiment, by using the process of allowing the user to perform the color designation through the UI screen 30, the control section 12 displays the designation frame W, which is movable and changeable in size, in the preview image 31 and designates the position or region desired by the user through the designation frame W. In addition, the control section 12 clearly shows the hue range corresponding to the hue of the image within the designation frame W in the hue scale 32 by using the specific indication 32a. Further, by displaying the live preview image 33 on the UI screen 30 together with the preview image 31 and hue scale 32, the result of the highlighting process or the drop-out process for the designated color as a target is displayed in conjunction with the designation using the designation frame W. Accordingly, the user is able to intuitively and easily designate the color, which is intended to be selected as the designated color, as compared with the methods in the related art. Simultaneously, by viewing the hue scale 32 and the live preview image 33, the user is able to clearly recognize the designated color at that time and the effect of the drop-out process or the like for the designated color as a target. Hence, the user is able to appropriately and accurately designate the color, which is a desired designation target, in the color image. Further, as a result, in the highlighting process or the drop-out process after the setting of the designated color, the color, which is a target of the highlighting process or the drop-out process desired by the user, can be appropriately and accurately highlighted or made to drop out.

4. Modified Examples

The invention is not limited to the above-mentioned embodiment, and may be modified into various forms without departing from the technical scope of the invention. Accordingly, the following modified examples may be allowed. It is apparent that combination of the embodiment and the modified examples is within the scope of the invention.

In the process of the step S110, the control section 12 may reject the acceptance of the designation of the region within the preview image 31 corresponding to the entire range of the hue scale 32. The reason is that, when the entire range of the hue scale 32 is set as the designated color, the effect of the subsequent highlighting process or drop-out process becomes practically meaningless (all hues are highlighted, or all hues are assimilated with the background).

For example, the image included in one or the plurality of designation frames W set in the preview image 31 may be an image including the hues in the entire range of the hue scale 32. In this case, the control section 12 displays an alarm message to the effect that the setting of the designation frame W is inappropriate on the UI screen 30, and does not set the hue range (the entire range of the hue scale 32), which is represented by the specific indication 32a at that time, as the designated colors even when the OK button 37 is pressed. Further, by directly operating the specific indication 32a, the specific indication 32a may be elongated so as to represent the entire range of the hue scale 32. Even in this case, the control section 12 displays the alarm message, and does not set the hue range, which is represented by the specific indication 32a, as the designated colors even when the OK button 37 is pressed.

During the process of the step S110, the control section 12 may perform, in accordance with the range change of the specific indication 32a, the display control process which changes the designation frame W in the preview image 31. That is, by performing the user's operation on the specific indication 32a, the control section 12 may change the position, the length (the range), and the number of the specific indication 32a. In this case, not only the display of the live preview image 33 is changed in conjunction with the corresponding change (refer to FIG. 3), but also the designation frame W within the preview image 31 is moved, enlarged/reduced, and increased/decreased at the same time, thereby keeping the designation frame W including the hue which is covered by the specific indication 32a.

FIG. 10 shows an example of a situation in which the control section 12 changes the designation frame W within the preview image 31 in conjunction with the movement and the elongation of the specific indication 32a shown in FIG. 7. That is, in the preview image 31 shown in the upper part of FIG. 10, the number of the designation frame W corresponding to the specific indication 32a before the movement and the elongation is one, and the size thereof is also small. In contrast, in the preview image 31 shown in the lower part of FIG. 10, in conjunction with the movement and the elongation of the specific indication 32a, the designation frame W is changed in position, size, and number. As described above, the control section 12 may generate a plurality of designation frames W (designated positions and/or designated regions) in the preview image 31, with the result that the designation frame W is changed in accordance with the change of the specific indication 32a. In this case, the control section 12 displays all the designation frames W (the designation frames W3, W4, and W5 in the example in the lower part, of FIG. 10) in the preview image 31 so as to enable the user to view the frames. With such a configuration, when directly changing the specific indication 32a, the user is able to clearly understand how the hue range of the changed specific indication 32a is distributed in the preview image 31 which is a color image. Hence, it is possible to perform more desirable color designation.

However, the control section 12 may generate a plurality of designated regions (designation frames W) in the preview image 31, with the result that the designation frame W is changed in accordance with the change of the specific indication 32a. In this case, the control section 12 may display only the largest one designation frame W of the preview image 31 in the preview image 31 so as to enable the user to view the frame. In the description of the example shown in the lower part of FIG. 10, the control section 12 may display only the largest one designation frame W among the plurality of generated designation frames W (the designation frames W3, W4, and W5). In other words, completely according to the user's operation for changing the specific indication 32a without restriction, the positions, the sizes, and the number of the designation frames W may be changed, and all designation frames W may be displayed in the preview image 31. However, in this case, the processing load of the control section 12 is large. Hence, only the representative (largest) designation frame W may be presented to the user.

When changing the designation frame W in accordance with the change of the specific indication 32a, the control section 12 may change the size, the position, and the number of the designation frame W with its rectangular shape maintained (the vertical and horizontal widths thereof are changed, but the rectangular shape thereof is maintained). Alternatively, when changing the designation frame W in accordance with the change of the specific indication 32a, the control section 12 may change the shape and the like of the designation frame W so as to make the shape and the like thereof perfectly coincide with the distribution of the hues that are the same as the hue range of the specific indication 32a on the preview image 31.

Furthermore, in the above description, the color designation control process through the UI screen 30 is executed before the highlighting process or drop-out process for the designated color. However, the color designation control process through the UI screen 30 may be executed not only for the highlighting process and the drop-out process but also for various processes such as color correction of the designated color.

What is claimed is:

1. A medium storing a color designation control program for causing a computer to execute:
   an image acquisition function of acquiring a color image; and
   a display control function of displaying a user interface screen, which includes at least a preview image of the acquired color image and a hue scale representing a change in hue, on a predetermined display while accepting designation of a position or a region within the preview image, acquiring a hue at the designed position or in the designated region from the preview image, and adding a specific indication for a range within the hue scale corresponding to the acquired hue,
   wherein the display control function is able to accept designation of a plurality of positions or a plurality of regions within the preview image, acquire hues at the plurality of designated positions or in the plurality of designated regions, and add specific indications for a plurality of ranges within the hue scale corresponding to the respective hues which are acquired for each of the plurality of designated positions or the plurality of designated regions.

2. The medium according to claim 1,
   wherein when the plurality of specific indications at least partially overlaps, the plurality of specific indications which overlaps is unified into one specific indication.

3. A medium storing a color designation control program for causing a computer to execute:
   an image acquisition function of acquiring a color image; and
   a display control function of displaying a user interface screen, which includes at least a preview image of the acquired color image and a hue scale representing a change in hue, on a predetermined display while accepting designation of a position or a region within the preview image, acquiring a hue at the designated position or in the designated region from the preview image, and adding a specific indication for a range within the hue scale corresponding to the acquired hue,
   wherein the display control function displays a frame, of which a position and a size is changeable, in the preview image while being able to accept change of the position and/or the size of the frame and accept the designation of the position and the region in the preview image on the basis of the frame.

4. The color designation control device according to claim 1, wherein when the hue scale represents an entire hue range except achromatic color, the display control function rejects acceptance of the designation of the region corresponding to an entire range of the hue scale in the preview image.

5. The medium according to claim 1, wherein
   the display control function displays a live preview image, which is according to the color image and in which a portion of the color image has the hue corresponding to the specific indication within the hue scale is highlighted or is made to drop out in the user interface screen,
   the display control function is able to accept change of a range of the specific indication within the hue scale, and change the highlighted or drop-out portion of the live preview image in accordance with the accepted change of the range of the specific indication,
   the display control function changes the designated position or the designated region of the preview image in accordance with the change of the range of the specific indication, and
   when generating a plurality of designated regions in the preview image as a result of the change in the designated position or the designated region of the preview image, the display control function displays only the largest one of the designated regions of the preview image in the preview image.

6. The medium according to claim 3, wherein
   the display control function displays a live preview image, which is according to the color image and in which a portion of the color image has the hue corresponding to the specific indication within the hue scale is highlighted or is made to drop out in the user interface screen,
   the display control function is able to accept change of a range of the specific indication within the hue scale, and change the highlighted or drop-out portion of the live preview image in accordance with the accepted change of the range of the specific indication,
   the display control function changes the designated position or the designated region of the preview image in accordance with the change of the range of the specific indication, and
   when generating a plurality of designated regions in the preview image as a result of the change in the designated position or the designated region of the preview image, the display control function displays only the largest one of the designated regions of the preview image in the preview image.

7. The medium according to claim 1, wherein
   the display control function displays a live preview image, which is according to the color image and in which a portion of the color image has the hue corresponding to the specific indication within the hue scale is highlighted or is made to drop out in the user interface screen,
   the display control function is able to accept change of a range of the specific indication within the hue scale, and change the highlighted or drop-out portion of the live preview image in accordance with the accepted change of the range of the specific indication,
   the display control function changes the designated position or the designated region of the preview image in accordance with the change of the range of the specific indication, and
   when generating a plurality of designated positions and/or a plurality of designated regions in the preview image as a result of the change in the designated position or the designated region of the preview image, the display control function displays all the designated positions and/or the designated regions in the preview image.

8. A medium storing a color designation control program for causing a computer to execute:
   an image acquisition function of acquiring a color image; and
   a display control function of displaying a user interface screen, which includes at least a preview image of the acquired color image and a hue scale representing a change in hue, on a predetermined display while accepting designation of a position or a region within the preview image, acquiring a hue at the designated position or in the designated region from the preview image, and adding a specific indication for a range within the hue scale corresponding to the acquired hue, wherein the display control function displays a live preview image, which is according to the color image and in which a portion of the color image has the hue corresponding to the specific indication within the hue scale is highlighted or is made to drop out in the user interface screen, the display control function is able to accept change of a range of the specific indication within the hue scale, and change is highlighted or drop-out portion of the live preview image in accordance with the accepted change of the range of the specific indication, the display control function changes the designated position or the designated region of the preview image in accordance with the change of the range of the specific indication, and when generating a plurality of designated positions and/or a plurality of designated regions in the preview image as a result of the change in the designated position or the designated region of the preview image, the display control function displays all the designated positions and/or the designated regions in the preview image.

9. The medium according to claim 8, wherein when generating a plurality of designated regions in the preview image as a result of the change in the designated position or the designated region of the preview image, the display control function displays only the largest one of the designated regions of the preview image in the preview image.

10. The medium of claim 3, wherein the display control function is able to accept designation of a plurality of positions or a plurality of regions within the preview image, acquire hues at the plurality of designated positions or in the plurality of designated regions, and add specific indications for a plurality of ranges within the hue scale corresponding to the respective hues which are acquired for each of the plurality of designated positions or the plurality of designated regions.

11. The medium of claim 8, wherein the display control function is able to accept designation of a plurality of positions or a plurality of regions within the preview image, acquire hues at the plurality of designated positions or in the plurality of designated regions, and add specific indications for a plurality of ranges within the hue scale corresponding to the respective hues which are acquired for each of the plurality of designated positions or the plurality of designated regions.

12. The medium of claim 1, wherein the display control function displays a frame, of which a position and a size is changeable, in the preview image while being able to accept change of the position and/or the size of the frame and accept the designation of the position and the region in the preview image on the basis of the frame.

13. The medium of claim 8, wherein the display control function displays a frame, of which a position and a size is changeable, in the preview image while being able to accept change of the position and/or the size of the frame and accept the designation of the position and the region in the preview image on the basis of the frame.

14. The medium of claim 3, wherein when the hue scale represents an entire hue range except achromatic color, the display control function rejects acceptance of the designation of the region corresponding to an entire range of the hue scale in the preview image.

15. The medium of claim 8, wherein when the hue scale represents an entire hue range except achromatic color, the display control function rejects acceptance of the designation of the region corresponding to an entire range of the hue scale in the preview image.

16. The medium of claim 3, wherein the display control function displays a live preview image, which is according to the color image and in which a portion of the color image has the hue corresponding to the specific indication within the hue scale is highlighted or is made to drop out in the user interface screen, the display control function is able to accept change of a range of the specific indication within the hue scale, and change the highlighted or drop-out portion of the live preview image in accordance with the accepted change of the range of the specific indication, the display control function changes the designated position or the designated region of the preview image in accordance with the change of the range of the specific indication, and when generating a plurality of designated positions and/or a plurality of designated regions in the preview image as a result of the change in the designated position or the designated region of the preview image, the display control function displays all the designated positions and/or the designated regions in the preview image.

17. A color designation control device storing the program according to claim 1, the program being for the device.

18. A color designation control device storing the program according to claim 3, the program being for the device.

19. A color designation control device storing the program according to claim 8, the program being for the device.

* * * * *